UNITED STATES PATENT OFFICE 2,370,571

PREPARATION OF CARBONIC ACID ESTERS

Irving E. Muskat and Franklin Strain, Akron, Ohio, assignors to Pittsburgh Plate Glass Company, Allegheny County, Pa., a corporation of Pennsylvania No Drawing. Application March 28, 1941, Serial No. 385,777

8 Claims. (Cl. 260—463)

This invention relates to a novel method of preparing unsaturated esters of polyhydroxy alcohols and is particularly related to the production of glycol esters. These compounds have a structure represented by the following general formula:

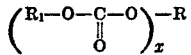

in which R is an organic radical of $x$ valence and $R_1$ is an organic radical such as hydrocarbon or substituted hydrocarbon radical and $x$ is a small whole number.

In accordance with this invention, unsaturated esters are produced by reacting an unsaturated alcohol with a polyhaloformate. The polyhaloformates of the following hydroxy compounds are suitable for the reaction: glycols or polyglycols, such as the alkylene glycols, for example, ethylene glycol, trimethylene glycol, pentamethylene glycol, tetramethylene glycol, propylene glycol or glycerol, alpha, beta methyl glycerol, or mannitol, etc.; polyhydroxy aromatic or araliphatic compounds such as resorcinol, hydroquinone, dihydroxy diphenyl, phthalyl alcohol, dihydroxy naphthalenes, etc., or the polyhydroxy ethers, polyglycols, polyglycerols, etc. such as the di-, tri-, and tetraethylene glycols, the di-, tri-, and tetrapropylene glycols, the polybutylene glycols, the polyglycerols or substituted polyglycerols, glycerol monomethyl ether, 1,2-dihydroxy 4 ethyloxy butane, αα-dihydroxy diphenyl ether. Also, the polyhydroxy cyclic ethers such as the dioxane diols or the compounds

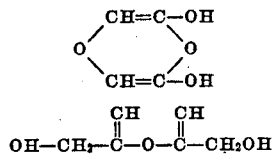

and

Also, the corresponding polyhydroxy thio-ethers such as bis (hydroxy ethyl) sulphide, $(OHC_2H_4)_2S$ bis (hydroxy phenyl) sulphide $(OHC_6H_4)_2S$, hydroxy ethyl hydroxy phenyl thio-ether

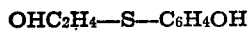

and the cyclic thio-ethers analogous to the above cyclic ethers may be treated. The chloroformates may be made by reacting the polyhydroxy compounds with phosgene, preferably at a low temperature, for example, 0° C. or below, in the manner described in copending application Serial No. 385,774 filed March 28, 1941, Case No. A-170, for the production of dichloroformates of polyglycols.

In accordance with the invention, the chloroformates may be reacted with unsaturated alcohols containing up to 10 carbon atoms such as allyl, methallyl, crotyl, isocrotyl, tiglyl, angelyl, methyl vinyl carbinyl, ethyl allyl, citronellol, cinnamyl, geraniol, propargyl, or the higher molecular alcohols such as oleyl alcohol or linoleyl alcohol or the halogen substituted alcohols such as 2-chloroallyl, 2-bromoallyl, chlorocrotyl alcohol, or 3-chlorobutene-2-1-1, etc. or the higher alcohols such as oleyl and linoleyl alcohol.

The reaction may be promoted by the presence of an alkaline reagent including organic bases such as pyridine, dimethyl aniline, and quaternary ammonium bases such as trimethyl phenyl ammonium hydroxide or the oxides, carbonates, and hydroxides of sodium, potassium, calcium, barium, strontium, magnesium and other alkali or earth alkali metals may be used. The alkaline agent may be in solution or it may be dispersed in the reaction liquid as a finely pulverized solid material. Finely divided calcium carbonate has been especially effective. Water may be present or the reaction may be conducted under substantially anhydrous conditions. It may, under some conditions, be desirable to add diluents such as water, acetone, benzene, carbon tetrachloride or dioxane.

The reaction temperature may be maintained at normal room temperature (15–25° C.). Frequently, however, higher or lower temperatures may be used, depending upon the nature of the alkaline reagent. When pyridine or sodium hydroxide are used, lower temperatures sustained by artificial cooling are desirable to improve the yield. When an alkaline earth metal carbonate such as calcium carbonate is the alkaline reagent, higher temperatures may be required and preferably, the temperature is maintained above about 50° C. The effect of reduced yields may be compensated by using excesses of alcohol and alkali. The excesses may be recovered and used in subsequent preparations.

The esters prepared in accordance with this invention are generally liquids but may, in some cases, be solids at normal temperatures. They are usually miscible in acetone, benzene, ethyl alcohol and dioxane and have utility as solvents for many organic plastics such as vinyl acetate, urea, styrene, cellulose, phenol and acrylic resins. The materials themselves are polymerizable to hard resins having many useful properties.

The following examples are illustrative:

Example I

To a mixture of 150 g. of allyl alcohol and 187 g. of ethylene glycol bis (chloroformate) was added slowly with stirring 200 g. of cold 50% aqueous sodium hydroxide, keeping the temperature at 0–5° C. The reaction mixture was diluted with water and the oily ester separated and distilled. Colorless glycol bis (allyl carbonate) B. P., 130–140° C. at 1–2 mm. pressure was obtained.

Example II

The process of Example I was repeated using an equivalent quantity of 2-chloroallyl alcohol in lieu of allyl alcohol and the corresponding ether glycol bis (2-chloroallyl carbonate) was obtained.

Example III

Five moles (935 gms.) of distilled ethylene glycol bis (chloroformate) was added slowly to a mixture of 929 cc. of methallyl alcohol (10% excess) and 954 cc. of pyridine (20% excess). The addition was made at a rate of 1.5 moles per hour and the temperature maintained at about 5° C. After the reaction mixture had been permitted to warm to room temperature it was diluted with water. The ester was washed successively with 5% sulphuric acid, 5% caustic soda and water. It was decolorized with charcoal by heating at 80–100° C. while evacuating at 15 mm. to remove methallyl alcohol. 915 gms. of ethylene bis (methallyl carbonate) were collected between 135 and 145° C. by distillation at a pressure of 3 mm.

Example IV

A 75 gm. sample of ethylene glycol bis (chloroformate) was mixed with 1.2 moles of methallyl alcohol representing 150% of the theoretical requirements for complete esterification. The mixture was placed in a three-necked flask equipped with stirring device, thermometer and reflux condenser. A slight excess (5%) of 50% NaOH was added slowly over a period of 81 minutes. The reaction vessel was maintained at a temperature between 5 and 9° C. by artificial cooling. After the mixing was completed, the mixture was stirred for 30 minutes at a temperature between 4 and 7° C. The ethylene glycol bis (methallyl carbonate) was purified by distillation at 2 mm. pressure. A yield of 53% was obtained.

Example V

A 75 gm. sample of ethylene glycol bis (chloroformate) was mixed with 150% excess of methallyl alcohol over the stoichiometric amount and with 150% excess of finely divided calcium carbonate in a three-necked flask equipped with stirrer and reflux condenser. The mixture was heated for 13 minutes between 85–120° C. and subsequently for 75 minutes between 120° C. and 125° C. The product was washed with very dilute hydrochloric acid and heated to 115° C. while passing a stream of $CO_2$ through the mixture. This procedure caused the separation of the unreacted methallyl alcohol. The mixture was then distilled under vacuum at a total pressure of 2 mm. 70.4 gms. of ethylene glycol bis (methallyl carbonate) was collected between 138 and 144° C.

Although the present invention has been described with reference to the specific details of certain embodiments thereof, it is not intended that such details shall be regarded as limitations upon the scope of the invention except insofar as included in the accompanying claims.

This application is a continuation-in-part of copending application Serial No. 361,280, filed October 15, 1940.

We claim:

1. The method of preparing glycol bis (unsaturated alcohol carbonate) which comprises reacting a glycol bis chloroformate with an unsaturated monohydric alcohol.

2. The method of preparing ethylene glycol bis (unsaturated alcohol carbonate) which comprises reacting ethylene glycol bis chloroformate with an unsaturated monohydric alcohol.

3. The method of preparing ethylene glycol bis (allyl carbonate) which comprises reacting ethylene glycol bis chloroformate with allyl alcohol.

4. The method of preparing ethylene glycol bis (chlorallyl carbonate) which comprises reacting ethylene glycol bis chloroformate with chloroallyl alcohol.

5. The method of preparing ethylene glycol bis (methallyl carbonate) which comprises reacting ethylene glycol bis chloroformate with methallyl alcohol.

6. The method of claim 2 in which the unsaturated alcohol is one of a group consisting of the prophenols, butenols, and pentenols.

7. The method of preparing a glycol bis (unsaturated alcohol carbonate) by reacting a glycol dichloroformate with a monohydric unsaturated alcohol in the presence of an alkaline reagent.

8. The method of preparing ethylene glycol bis (unsaturated alcohol carbonate) by reacting ethylene glycol dichloroformate with a monohydric unsaturated alcohol in the presence of finely divided calcium carbonate at a temperature above 50° C.

IRVING E. MUSKAT.
FRANKLIN STRAIN.